US009658107B2

(12) United States Patent
Anwar et al.

(10) Patent No.: US 9,658,107 B2
(45) Date of Patent: May 23, 2017

(54) SELF CALIBRATION FOR MIRROR POSITIONING IN OPTICAL MEMS INTERFEROMETERS

(71) Applicant: Si-Ware Systems, Cairo (EG)

(72) Inventors: Momen Anwar, Cairo (EG); Mostafa Medhat, Cairo (EG); Bassem Mortada, Cairo (EG); Ahmed Othman El Shater, Cairo (EG); Mina Gad Seif, Cairo (EG); Muhammed Nagy, Cairo (EG); Bassam A. Saadany, Cairo (EG); Amr N. Hafez, Cairo (EG)

(73) Assignee: Si-Ware Systems, Cairo (EG)

(*) Notice: Subject to any disclaimer, the term of this patent is extended or adjusted under 35 U.S.C. 154(b) by 0 days.

(21) Appl. No.: 15/130,876

(22) Filed: Apr. 15, 2016

(65) Prior Publication Data

US 2016/0231172 A1    Aug. 11, 2016

Related U.S. Application Data

(63) Continuation-in-part of application No. 14/165,997, filed on Jan. 28, 2014, which is a continuation-in-part
(Continued)

(51) Int. Cl.
*G01B 9/02* (2006.01)
*G01J 3/453* (2006.01)
(Continued)

(52) U.S. Cl.
CPC ............. *G01J 3/4532* (2013.01); *G01B 7/08* (2013.01); *G01B 9/02068* (2013.01);
(Continued)

(58) Field of Classification Search
CPC .. G01B 9/02068; G01B 7/08; G01B 9/02071; G01J 3/45; G01J 3/4532; G01J 3/4535; G02B 26/0841
See application file for complete search history.

(56) References Cited

U.S. PATENT DOCUMENTS

| 4,444,501 A | 4/1984 | Schwiesow |
| 2011/0222067 A1 | 9/2011 | Saadany et al. |
| 2014/0139839 A1 | 5/2014 | Medhat et al. |

OTHER PUBLICATIONS

Price, Measurement of the Sodium D Emission Lines Using a Michelson Interferometer, 2008 (Price), available at https://www.phys.ksu.edu/personal/rprice/Michelson_Interferometer.pdf.*
Cable, Calibration, A Technician's Guide, ISA Technician Series, 2005.*
(Continued)

*Primary Examiner* — Daniel Miller
(74) *Attorney, Agent, or Firm* — Loza & Loza, LLP; Holly L. Rudnick

(57) ABSTRACT

A Micro-Electro-Mechanical System (MEMS) apparatus provides for self-calibration of mirror positioning of a moveable mirror of an interferometer. At least one mirror in the MEMS apparatus includes a non-planar surface. The moveable mirror is coupled to a MEMS actuator having a variable capacitance. The MEMS apparatus includes a capacitive sensing circuit for determining the capacitance of the MEMS actuator at multiple reference positions of the moveable mirror corresponding to a center burst and one or more secondary bursts of an interferogram produced by the interferometer based on the non-planar surface. A calibration module uses the actuator capacitances at the reference positions to compensate for any drift in the capacitive sensing circuit.

26 Claims, 13 Drawing Sheets

Related U.S. Application Data of application No. 13/044,238, filed on Mar. 9, 2011, now Pat. No. 8,873,125.

(60) Provisional application No. 62/269,866, filed on Dec. 18, 2015, provisional application No. 61/311,966, filed on Mar. 9, 2010.

(51) Int. Cl.
    *G02B 26/08*    (2006.01)
    *G01J 3/45*     (2006.01)
    *G01B 7/06*     (2006.01)

(52) U.S. Cl.
    CPC ............ *G01B 9/02071* (2013.01); *G01J 3/45* (2013.01); *G01J 3/4535* (2013.01); *G02B 26/0841* (2013.01); *G01B 2290/35* (2013.01)

(56) References Cited

OTHER PUBLICATIONS

Understanding Optical Specifications, Edmund Optics, p. 4, Surface Flatness, available at http://www.edmundoptics.com/resources/application-notes/optics/understanding-optical-specifications/ on Sep. 18, 2005.*
PCT/US2016/028144. Int'l Search Report & Written Opinion (Sep. 1, 2016). Applicant: Si-Ware Systems.
Herres et al. "Understanding FT-IR data processing", Series (1984).
Tortschanoff et al. "Improved MOEMS based ultra rapid Fourier transform infrared spectrometer", Proc. SPIE 7319, Next-Generation Spectroscopic Technologies II, 73190I (Apr. 28, 2009).

* cited by examiner

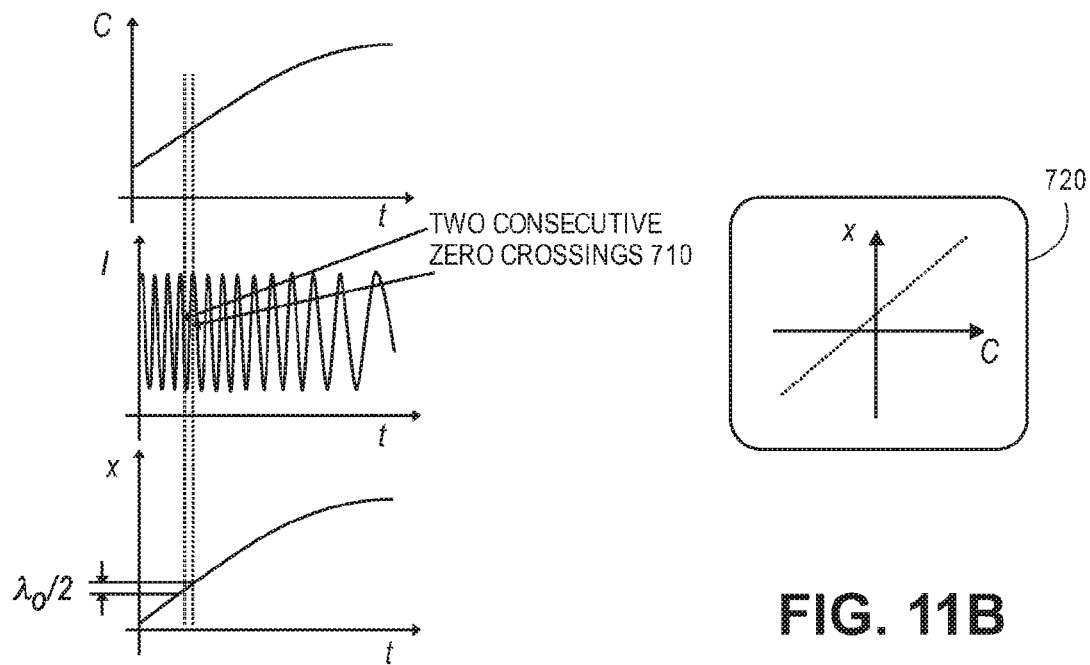
FIG. 11A
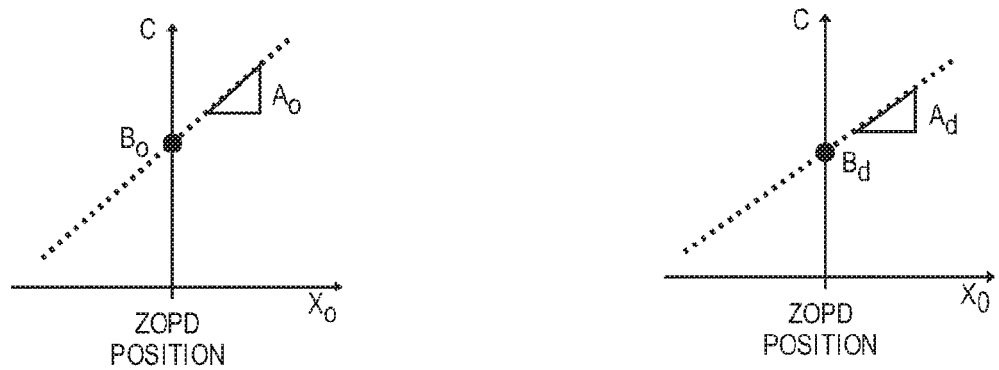
FIG. 11B
FIG. 12A
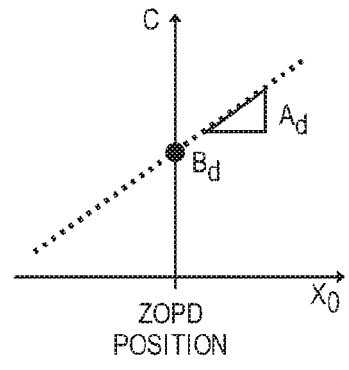
FIG. 12B

SELF CALIBRATION FOR MIRROR POSITIONING IN OPTICAL MEMS INTERFEROMETERS

CROSS REFERENCE TO RELATED PATENTS

The present U.S. Utility Patent Application claims priority pursuant to 35 U.S.C. §119(e) to the following U.S. Provisional Patent Application(s) which are hereby incorporated herein by reference in their entirety and made part of the present U.S. Utility Patent Application for all purposes:

1. U.S. Provisional Application Ser. No. 62/269,866, entitled "Self Calibration for Mirror Positioning in Optical MEMS Interferometers,", filed Dec. 18, 2015.

The present U.S. Utility Patent Application further claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility application Ser. No. 14/165,997, entitled "Self Calibration for Mirror Positioning in Optical MEMS Interferometers,", filed Jan. 28, 2014, which claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:
    a. U.S. Utility application Ser. No. 13/044,238, entitled "A Technique to Determine Mirror Position in Optical Interferometers,", filed Mar. 9, 2011, now issued as U.S. Pat. No. 8,873,125, which claims priority pursuant to 35 U.S.C. §119(e) to the following U.S. Provisional Patent Application which is hereby incorporated herein by reference in its entirety and made part of the present U.S. Utility Patent Application for all purposes:
        (i). U.S. Provisional Application Ser. No. 61/311,966, entitled "Electronics for MEMS-based systems: design issues and tradeoffs,", filed Mar. 9, 2010.

BACKGROUND OF THE INVENTION

Technical Field of the Invention

The present disclosure relates in general to optical spectroscopy and interferometry, and in particular to the use of Micro Electro-Mechanical System (MEMS) technology in optical interferometers.

Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices facilitates the integration of such MEMS devices into mobile and hand held devices.

Moreover, MEMS technology, with its numerous actuation techniques, enables the realization of new functions and features of photonic devices, such as optical tunability and dynamic sensing applications. For example, by using MEMS actuation (electrostatic, magnetic or thermal) to control a movable mirror of a Michelson Interferometer, small displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), the velocity of the moving mirror (e.g., using the Doppler Effect), or simply as an optical phase delay element.

A key component in the accuracy of such interferometers is determining the position of the moveable mirror. Traditionally, a laser and auxiliary interferometer have been used to measure the moving mirror position. However, introducing a bulky laser source and additional interferometer increases the size, cost and complexity of the interferometer system.

Therefore, there is a need for a mechanism to determine the moveable mirror position with reduced size, cost and complexity.

SUMMARY OF THE INVENTION

Embodiments of the present disclosure provide a Micro-Electro-Mechanical System (MEMS) apparatus for performing self-calibration of mirror positioning. The MEMS apparatus includes at least one mirror having a non-planar surface and a MEMS actuator having a variable capacitance that is coupled to a moveable mirror to cause a displacement thereof. The MEMS apparatus further includes a memory maintaining a table mapping stored capacitances of the MEMS actuator to respective stored positions of the moveable mirror and a capacitive sensing circuit coupled to the MEMS actuator for sensing the capacitance of the MEMS actuator at multiple reference positions of the moveable mirror corresponding to a center burst and one or more secondary bursts of an interferogram produced by the interferometer based on the non-planar surface. A calibration module uses the actuator capacitances at the reference positions to determine a correction amount to be applied to the stored capacitances.

BRIEF DESCRIPTION OF THE DRAWINGS

A more complete understanding of the present disclosure may be obtained by reference to the following detailed description when taken in conjunction with the accompanying drawings wherein:

FIGS. 11A and 11B are diagrams illustrating a capacitive sensing curve, in accordance with embodiments of the present disclosure;

FIGS. 12A and 12B are diagrams illustrating drift in the capacitive sensing curve, in accordance with embodiments of the present disclosure;

DETAILED DESCRIPTION OF THE DRAWINGS

In accordance with embodiments of the present disclosure, a self-calibration technique is provided to correct the position of a moveable mirror in Micro Electro-Mechanical System (MEMS) applications, such as interferometer/spectrometer applications. This technique enables the integration of the interferometer/spectrometer system on a small chip and reduces the cost and complexity of the system.

Figure 1:
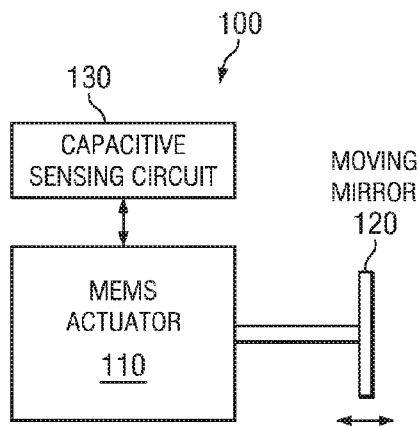
FIG. 1 is a block diagram of an exemplary Micro Electro Mechanical System (MEMS) apparatus for determining the position of a moveable mirror in accordance with embodiments of the present disclosure.

Referring now to FIG. 1, there is illustrated an exemplary MEMS apparatus 100, in accordance with embodiments of the present disclosure. The MEMS apparatus 100 includes a MEMS actuator 110 and a moveable mirror 120. The MEMS actuator 110 is an electrostatic actuator, such as a comb drive actuator, parallel plate actuator or other type of electrostatic actuator. The moveable mirror 120 is coupled to the MEMS actuator 110, such that motion of the MEMS actuator causes a displacement in the position of the moveable mirror 120.

Figure 2:
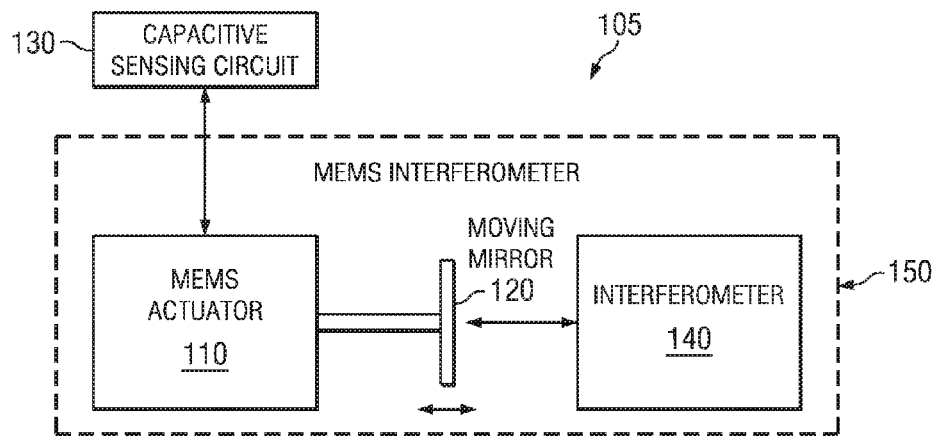
FIG. 2 is a block diagram illustrating exemplary components of a MEMS interferometer system for determining the position of the moveable mirror in accordance with embodiments of the present disclosure.

In many MEMS applications, it is necessary to have knowledge of the position of the moveable mirror 120. For example, in interferometer applications, the position of the moveable mirror 120 is used to process the output of the interferometer. An example of a MEMS interferometer system 105 is shown in FIG. 2. As can be seen in FIG. 2, the MEMS actuator 110 and moveable mirror 120, together with other components of an interferometer 140, such as a beam splitter, fixed mirror and photodetector (as described in more detail below in connection with FIG. 7) form a MEMS interferometer 150. The MEMS interferometer 150 may include, for example, a Fourier Transform Infrared Spectroscopy (FTIR) spectrometer, a Michelson interferometer, a Mach Zender interferometer and/or a Fabry-Perot interferometer.

The displacement of the moveable mirror 120 produces an optical path length difference between the two arms of the interferometer 140 in order to achieve the desired interference pattern at the photodetector. To effectively process the signal output from the photodetector, the position of the moveable mirror 120 in at least one plane must be ascertained.

Therefore, referring now to FIGS. 1 and 2, in order to measure the moveable mirror position, the MEMS apparatus 100 also includes a capacitive sensing circuit 130 coupled to the MEMS actuator 110. Since the MEMS actuator 110 is an electrostatic actuator, the MEMS actuator 110 has a variable capacitance that can be measured by the capacitive sensing circuit 130. For example, in one embodiment, the capacitive sensing circuit 130 can be coupled to the two plates of the MEMS actuator 110 to detect the capacitance between the plates (i.e., measure the current value of the capacitance, hereinafter referred to as the "current capacitance," of the MEMS actuator).

Based on the measured current capacitance, the position of the moveable mirror 120 can be determined. As can be appreciated, the separation (distance) between the two plates of the MEMS actuator 110 varies as the mirror 120 moves. Since the MEMS actuator 110 is an electrostatic actuator, the capacitance between the two plates is directly (or in some cases inversely) proportional to the separation between the two plates. As such, the capacitance between the plates can be used to determine this separation, which in turn can be used to determine the mirror position.

Figure 3:
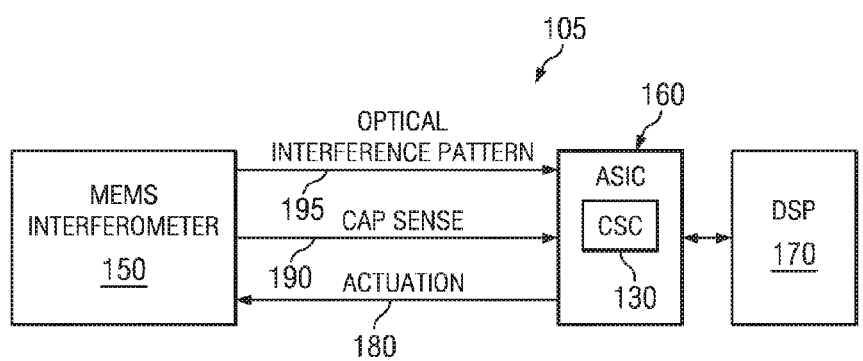
FIG. 3 is a block diagram illustrating further exemplary components of the MEMS interferometer system in accordance with embodiments of the present disclosure.

FIG. 3 is a block diagram illustrating exemplary components of the MEMS interferometer system 105 in accordance with embodiments of the present disclosure. In FIG. 3, the capacitive sensing circuit (CSC) 130 is implemented within an application specific integrated circuit (ASIC) 160. The ASIC 160 is further coupled to the MEMS interferometer 150 and to a digital signal processor (DSP) 170. In one embodiment, the DSP 170 is implemented on the ASIC 160. Integrating the DSP 170 on the ASIC 160 yields an attractive, self-contained solution that can be easily integrated in a larger system. However, this imposes restrictions on the ASIC technology selection and may result in interference between the digital part and the sensitive analog front end. Therefore, in other embodiments, the DSP 170 can be implemented on another ASIC or as software executable on a general-purpose personal computer.

The CSC 130 within the ASIC 160 is coupled to receive a capacitive sensing signal 190 from the MEMS actuator of the MEMS interferometer 150. The CSC 130 measures the capacitive sensing signal 190 to determine the current capacitance of the MEMS actuator and transmits the value of the current capacitance to the DSP 170. The DSP 170 processes the current capacitance value to determine the position of the moving mirror within the MEMS interferometer 150.

The ASIC 160 also includes circuitry for generating an actuation signal 180 and transmitting the actuation signal 180 to the MEMS actuator of the MEMS interferometer 150 to control movement of the MEMS actuator. For example, in an exemplary embodiment, the ASIC 160 includes a digital-to-analog converter (DAC) that supports any arbitrary actuation profile. The DAC may also be of very high resolution in order to reduce actuation noise and have a very high spurious-free dynamic range to ensure that unwanted resonance modes are not excited.

In addition, the ASIC 160 is further coupled to receive an optical interference pattern 195 output from the MEMS interferometer 150 and to provide the optical interference pattern 195 to the DSP 170 for processing. For example, in an exemplary embodiment, the MEMS interferometer system 105 is a MEMS FTIR spectrometer system that uses a general purpose MEMS-interface CMOS ASIC 160. In this embodiment, the MEMS interferometer 150 includes a photodetector, a fixed mirror and the moveable mirror. With the motion of the moveable mirror, the photodetector captures the optical interference pattern 195. The ASIC 160 may include a low-noise signal conditioning path that amplifies the signal, removes any dc offsets and provides necessary anti-aliasing filtering. The signal conditioning may be performed in a highly linear manner to reduce any spurious tones in the final output spectrum. At the DSP 170, spectrum analysis of the conditioned pattern with knowledge of the position of the moveable mirror can identify the light wavelength and the spectral print of any material in the light path.

Figure 4:
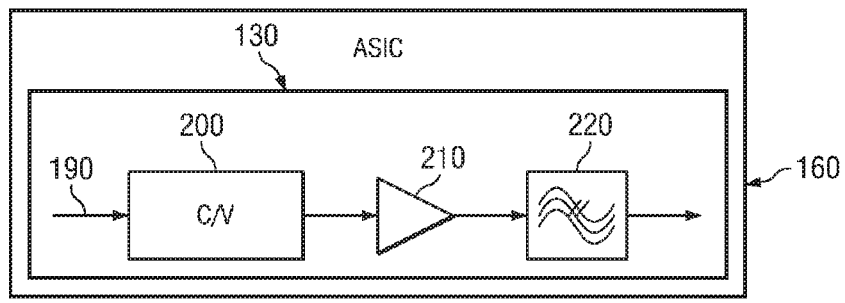
FIG. 4 is a block diagram illustrating exemplary components of an application specific integrated circuit (ASIC) for use within the MEMS interferometer system, in accordance with embodiments of the present disclosure.

Referring now to FIG. 4, an exemplary CRC 130 is shown. The CRC 130 includes a capacitance-to-voltage converter (C/V) 200, amplifier 210 and low pass filter 220. The C/V 200 is coupled to receive the capacitive sensing signal 190 indicating the current capacitance of the MEMS actuator and operates to convert the current capacitance into a voltage. In particular, the C/V produces a voltage output proportional to the capacitance between the two terminals of the MEMS actuator. The amplifier 210 amplifies the voltage output from the C/V 200 and the low pass filter 220 filters the voltage to remove any spurious signals. In an exemplary embodiment, the C/V 200 is a very low noise C/V that has a wide range of gain and dc offset removal to support wide capacitance ranges superimposed on various fixed capacitances. Low noise levels are desired for the CRC 130, since the mirror position inaccuracy directly impacts the system signal-to-noise ratio (SNR). The ASIC 160 may also exhibit very low voltage and noise levels to allow for resolutions in excess of 18 bits. In further embodiments, the ASIC 160 may also include capacitance calibration circuitry to calibrate the C/V 200.

Figure 5:
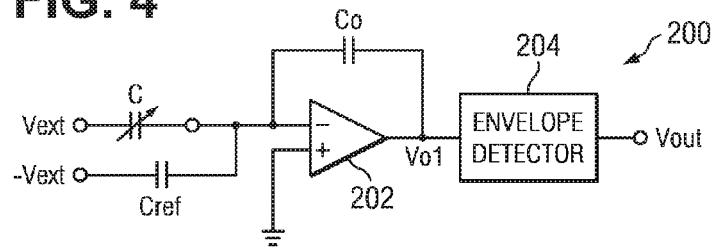
FIG. 5 is a circuit diagram illustrating an exemplary capacitance to voltage circuit for use within the ASIC of FIG. 4, in accordance with embodiments of the present disclosure.

An example of a C/V 200 is shown in FIG. 5. The C/V 200 includes an input terminal for receiving a capacitance being measured C, an input terminal for receiving a reference capacitance Cref, an operational amplifier 202, a feedback capacitor Co and an Envelope Detector circuit 204. In an exemplary operation, an ac signal of known frequency (for example, 10 kHz) is applied to one terminal of capacitance C, while a negative version of the same excitation signal is applied to the reference capacitor Cref. The output of the operational amplifier 202 is an ac signal of the same frequency whose amplitude is proportional to the value (C-Cref).

The Envelope Detector circuit 204 detects the envelope of the output of the operational amplifier 202. In particular, the Envelope Detector circuit 204 operates to generate an output voltage proportional to the amplitude (envelope) of the ac signal output from the operational amplifier 202. As shown in FIG. 5, the Envelope Detector circuit 204 detects the envelope of signal Vol output from the operational amplifier 202 and produces a voltage Vout that is proportional to the value of the capacitance being measured. It should be understood other circuit designs for the C/V 200 are possible, and the present disclosure is not limited to any particular C/V circuit design. For example, in another embodiment, the C/V 200 may have multiple terminals to sense the difference in two capacitors, where the differential value is proportional to the mirror position.

Figure 6:
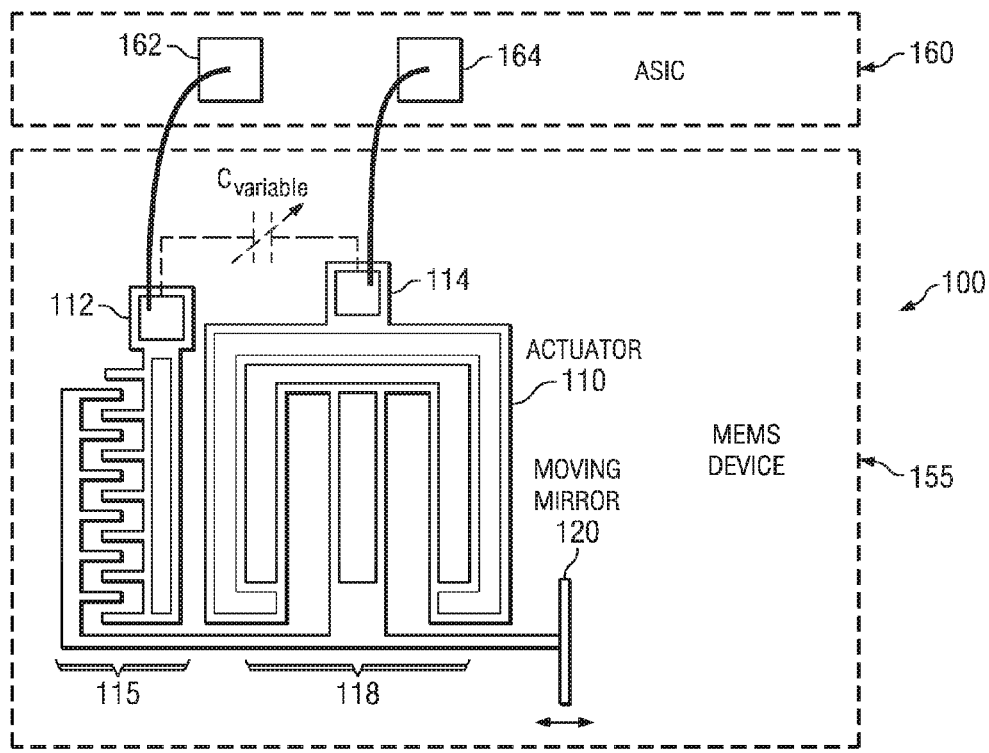
FIG. 6 is a diagram illustrating an exemplary architecture of the MEMS apparatus, in accordance with embodiments of the present disclosure.

FIG. 6 is a diagram illustrating an exemplary architecture of the MEMS apparatus 100, in accordance with embodiments of the present disclosure. The MEMS apparatus 100 includes the ASIC 160 and a MEMS device 155, such as a MEMS interferometer. The MEMS device 155 includes an electrostatic comb drive MEMS actuator 110 and a moveable mirror 120. The electrostatic comb drive MEMS actuator 110 shown in FIG. 6 is formed of a comb drive 115 and spring 118, each having a respective terminal 112 and 114. By applying a voltage to the comb drive 115 at terminal 112, a potential difference results across the actuator 110, which induces a capacitance therein, causing a driving force to be generated as well as a restoring force from the spring 118, thereby causing a displacement of moveable mirror 120 to the desired position. The induced capacitance Cvariable can be measured across terminals 112 and 114 by connecting terminals 112 and 114 to ports 162 and 164 on the ASIC 160.

In one embodiment, the actuation signal from ASIC 160 is transmitted over the same port (port 162) as the capacitance sensing signal using time or frequency division multiplexing. By having both functions (actuation and capacitive sensing) on a single port, the maximum actuation voltage necessary may be reduced, while also increasing the sensed capacitance. However, this may lead to undesired interaction between the sense and actuation circuitry. Therefore, in other embodiments, the actuation signal is sent over a different port (not shown) on the ASIC 160. It should be understood that the layout and features of the MEMS actuator 110 shown in FIG. 6 are merely exemplary, and that the invention can be realized with any electrostatic MEMS actuator design, whether a comb drive actuator, parallel plate actuator or other type of electrostatic MEMS actuator.

Figure 7:
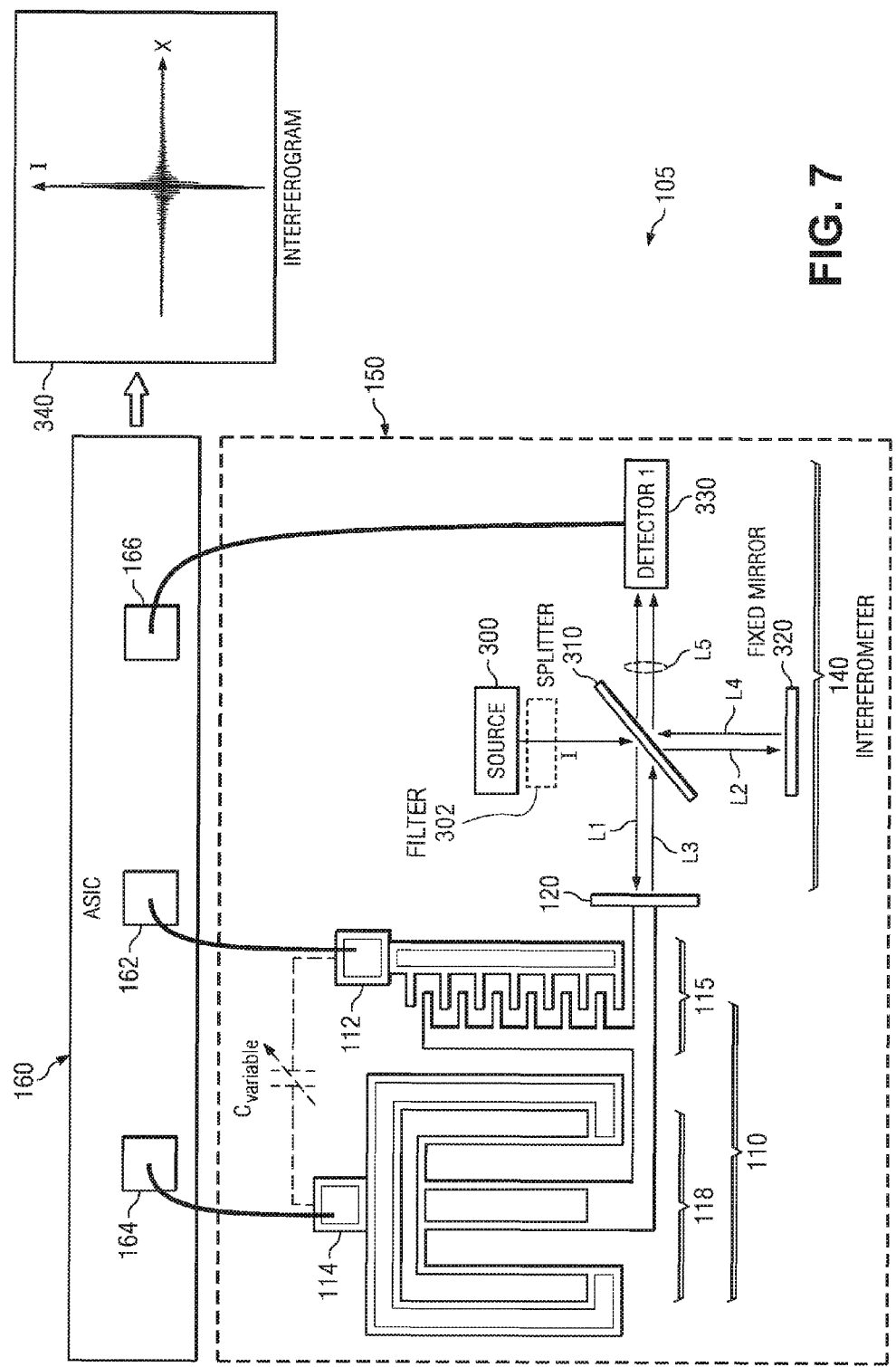
FIG. 7 is a diagram illustrating an exemplary architecture of the MEMS interferometer system, in accordance with embodiments of the present disclosure.

FIG. 7 is a diagram illustrating an exemplary architecture of the MEMS interferometer system 105, in accordance with embodiments of the present disclosure. The MEMS interferometer system 105 includes the MEMS interferometer 150 and ASIC 160. The MEMS interferometer 150 may be, for example, a Fourier Transform Infrared (FTIR) spectrometer that is realized over an SOI wafer to allow for a MEMS-actuated moving mirror.

The MEMS interferometer 150 includes the MEMS actuator 110 and interferometer 140. As shown in FIG. 7, the interferometer 140 includes a light source 300, beam splitter 310, fixed mirror 320, photodetector 330 and moveable mirror 120. The light source 300 produces an incident beam I that travels through the interferometer 140 until it reaches the half plane beam splitter 310. In an exemplary embodiment, the beam splitter 310 is formed at an interface between a first medium (i.e., silicon (Si)) and a second medium (i.e., air). The silicon/air interface beam splitter 310 is positioned at an angle (for example, 45 degrees) from the incident beam I. The desired angle may be produced, for example, by photolithographically defining a surface of the silicon medium.

Upon impinging the half plane beam splitter 310, the incident beam I is split into two interfering beams L1 and L2. L1 originates from the partial reflection of the incident beam I from the silicon/air half plane beam splitter 310, and thus has a reflection angle equal to the beam incidence angle. L2 originates from the partial transmission of the incident beam I through silicon/air half plane beam splitter 310 and propagates at least partially in silicon at a refraction angle (determined by Snell's law). As a result, L1 propagates towards the moveable mirror 120, while L2 propagates towards fixed mirror 320.

Beam L1 is reflected by moveable mirror 120, thus producing reflected beam L3, while beam L2 is reflected by fixed mirror 320, thus producing reflected beam L4. As shown in FIG. 7, both beams L3 and L4 take the same optical path of L1 and L2 respectively (in the opposite direction) after reflection from mirrors 120 and 320 respectively, back towards the half plane beam splitter 310. Thus, in embodiments in which the spectrometer/interferometer is used as a Fourier Transform (FT) spectrometer, one interferometer arm is formed by beams L1/L3 and includes the beam splitter 310 and moveable mirror 120, while another interferometer arm is formed by beams L2/L4 and includes fixed mirror 320.

An interference pattern L5 is produced from reflected beams L3 and L4 interfering at the beam splitter 310. The interference pattern L5 is detected by detector 330. The output of the detector 330 is input to the ASIC 160 via terminal 166. In one embodiment, the detector 330 includes a photodetector that is assembled through micromachining in the substrate (e.g., by etching the top surface of the substrate to realize an opening within which the photodetector may be placed) or that is realized monolithically within the substrate either through doping (e.g., to realize a P-I-N diode) or partial metallization (e.g., to realize metal-semiconductor-metal MSM photodetector).

As also shown in FIG. 7, moveable mirror 120 is movable using a SOI electrostatic MEMS actuator 110. As in FIG. 6, the electrostatic MEMS actuator 110 is shown formed of a comb drive 115 and spring 118. A voltage can be applied to the comb drive 114 via terminal 114, thereby inducing a capacitance across terminals 112 and 114 and causing a displacement of the moveable mirror 120 to the desired position for reflection of the beam L1. As such, an optical path length difference (OPD) between beams L3 and L4 can be achieved that is substantially equal to twice the mirror displacement.

In addition, the capacitance across terminals 112 and 114 can be measured by the ASIC 160 via ports 162 and 164 to determine the position of the moveable mirror 120. Based on the determined moveable mirror position and the output of the detector 330, an interferogram 340 can be produced (e.g., by the DSP 170 shown in FIG. 3) to identify the light wavelength and the spectral print of any material in the light path.

The moveable mirror 120 in FIG. 7 is shown positioned at the zero path difference between the two optical paths (L1/L3 and L2/L4). However, in other embodiments, to remove phase noise and errors produced as a result of the capacitive sensing technique, the moveable mirror 120 can be positioned at a distance 6 behind the zero path position, and the moveable mirror 120 can be moved through the zero path position such that measurements are taken on both the positive and negative sides of the zero path position. In this embodiment, the source 300 is a wide band source (i.e., white light source) and the negative and positive sides may be equal or not equal. At the DSP 170 (shown in FIG. 3), the complex Fourier transform of the interferogram 340 can be taken to compensate for any phase errors in the mirror position. In another embodiment, instead of recording both the positive and negative sides of the interferogram, only a small part of the interferogram on the negative (left) side may be taken and used by the DSP to extract the correct signal and remove some of the phase noise and errors produced by the capacitive sensing technique. In another embodiment, the source 300 is a narrow band source (i.e., a laser) producing an input beam of known wavelength. In yet another embodiment, the source 300 is a wide band source and a narrow band optical filter 302 may optionally be used to produce an input beam of known central wavelength.

In one embodiment, mirrors 120 and 320 are metallic mirrors, where selective metallization (e.g. using a shadow mask during metallization step) is used to protect the beam splitter. In another embodiment, non-metallic vertical Bragg mirrors are used to obtain a small foot print spectrometer. The Bragg mirrors can be realized using Deep Reactive Ion Itching (DRIE), thus producing successive vertical silicon/air interfaces. In addition, the Bragg mirrors can be designed either to have a wide spectrum reflection response to act as simple reflectors or with a wavelength selective response, depending on the application.

Although a silicon/air interface is described herein for the beam splitter 310, other mediums providing a half wave plane beam splitter can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interface.

Figure 8:
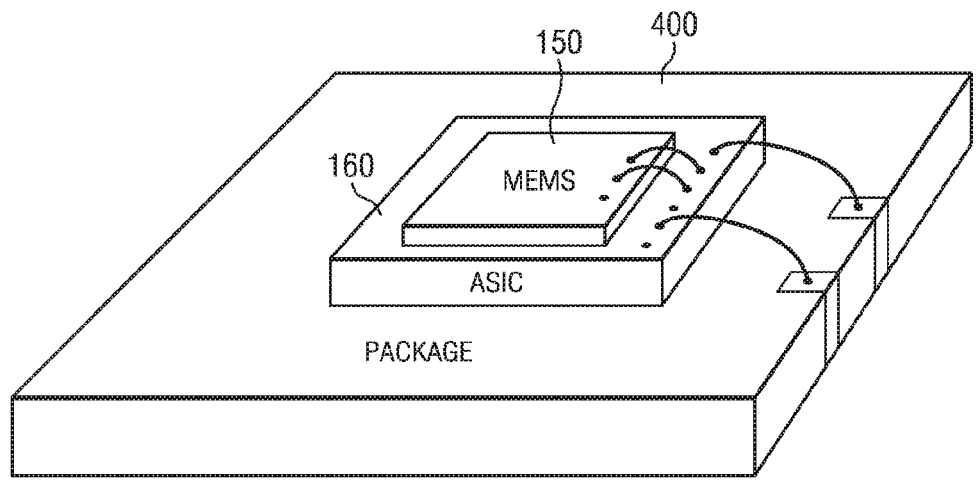
FIG. 8 is a diagram illustrating an exemplary MEMS die package, in accordance with the present disclosure.

FIG. 8 is a diagram illustrating an exemplary MEMS die package 400, in accordance with the present disclosure. By using capacitive sensing to determine the position of the moveable mirror, the MEMS interferometer 150 can be integrated with the ASIC 160 chip together on the same MEMS die package 400, thereby reducing the size, cost and complexity of the MEMS system.

Figure 9:
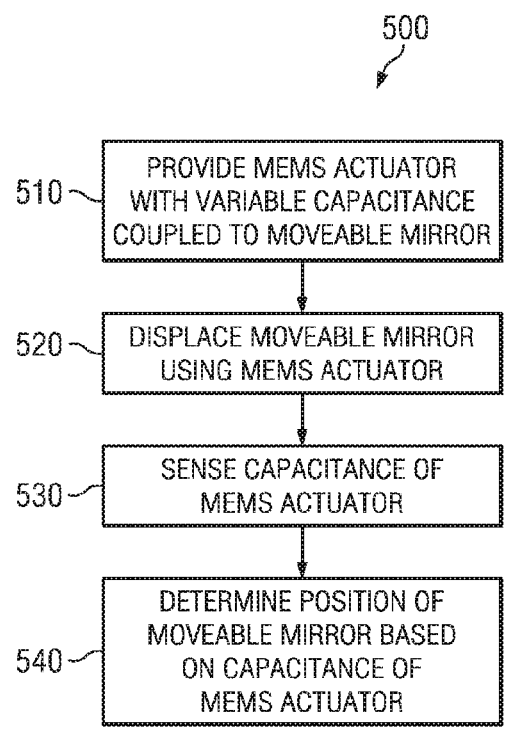
FIG. 9 illustrates an exemplary method for determining the position of a moveable mirror within a MEMS apparatus, in accordance with embodiments of the present disclosure.

FIG. 9 illustrates an exemplary method 500 for determining the position of a moveable mirror within a MEMS apparatus, in accordance with embodiments of the present disclosure. The method begins at 510, where an electrostatic MEMS actuator having a variable capacitance is provided coupled to the moveable mirror. At 520, the moveable mirror is displaced using the MEMS actuator. Thereafter, at 530, a current capacitance of the MEMS actuator is sensed, and at 540, the position of the moveable mirror is determined based on the current capacitance of the MEMS actuator.

Figure 10:
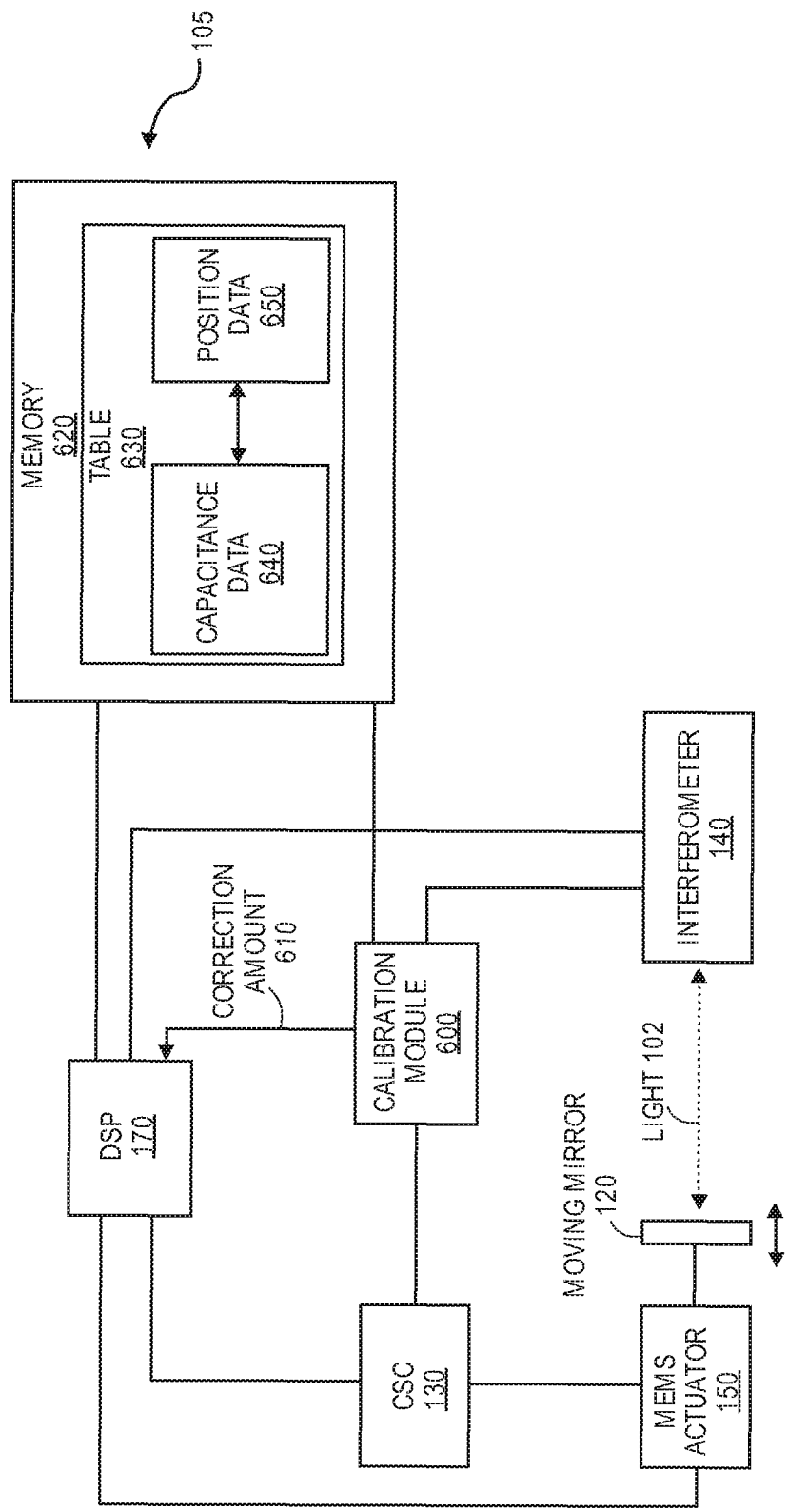
FIG. 10 is a block diagram illustrating an exemplary MEMS interferometer system for performing self-calibration of mirror positioning, in accordance with embodiments of the present disclosure.

Referring now to FIG. 10, in some embodiments, the capacitive sensing circuit may suffer from performance drifts due to stress, temperature, humidity, normal drift of electronic components, as well as other reasons. Such drift in the capacitive sensing circuit affects the accuracy of the position of the moveable mirror, which directly affects the spectrometer/interferometer operation. Therefore, as shown in FIG. 10, a calibration module 600 can be included in the MEMS interferometer 105 to calibrate the capacitive sensing circuit (CSC) 130 used for the determination of optical path difference modulation. In one embodiment, the calibration module 600 is an algorithm executable by the DSP 170 and may be stored, for example, in memory 620. In another embodiment, the calibration module 600 is included within the ASIC of the CSC 130, or within an additional ASIC.

As discussed above, the movable mirror 120 introduces an optical path difference in one path of the interferometer 140 leading to an output interferogram from which spectrum can be extracted by Fourier transform as indicated in Equations 1 and 2 below.

$$I(x) = \int_{-\infty}^{\infty} B(v)\cos(2\pi vx)dv \quad \text{(Equation 1)}$$

$$B(v) = \int_{-\infty}^{\infty} I(x)\cos(2\pi vx)dx \quad \text{(Equation 2)}$$

In order to obtain accurate spectra, a precise determination of the optical path difference (OPD) due to the movable mirror displacement is needed. The accuracy of the OPD is initially calibrated using the CSC 130, as discussed above, to capacitively sense motion of the MEMS actuator 150 as the moving mirror 120 is moved through the full range of motion. The resulting measured capacitances (capacitance data 640) are mapped to the corresponding OPD (position data 650), and then can be stored within a table 630 in a memory 620.

For example, a light beam 102 of a certain known wavelength $\lambda_o$ can be injected into the MEMS interferometer 105 to calibrate the CSC 130 on the production line once for each spectrometer sample. The light beam 102 may be produced from a light source (e.g., a laser) having a known wavelength or from a wideband light source whose white light output is passed through a narrow band optical filter to produce the light beam 102 at the known wavelength. As can be seen in FIGS. 11A and 11B, the capacitance to OPD relation is determined using the fact that two consecutive peaks of the resulting interferogram represents an OPD of $\lambda_o$ and mapping this to the measured capacitance variation to produce a capacitive sensing curve 720, as follows:

$$I(x) = I_o(v_o)\cos\left(2\pi \frac{x}{\lambda_o}\right) \quad \text{(Equation 3)}$$

where the distance ($\Delta x$) between two consecutive zero crossings 710 is equal to $\lambda_o/2$.

Referring again to FIG. 10, the capacitive sensing curve 720 of FIG. 11B can be used to populate the look-up table 620 of C (capacitance data 640) to x (position data 650) relation, which can then be used to determine the position of the moveable mirror 120 during subsequent operations of the MEMS interferometer 105. For example, during a subsequent operation of MEMS interferometer 105, the capacitance across the MEMS actuator 150 can be measured by the CSC 130, and the measured capacitance can be provided to the DSP 170 to determine the position of the moveable mirror 120 by accessing the table 630 in memory 620.

In addition, as shown in FIG. 10, to compensate for any drift in the CSC 130, the calibration module 600 can further determine a correction amount 610 and provide this correction amount 610 to the DSP 170. The DSP 170 can use the correction amount 610 and the measured capacitance provided by the CSC 130 to determine a corrected capacitance, and then use the corrected capacitance to determine the correct mirror position by performing a table 630 look-up of the corrected capacitance. Based on the correct moveable mirror position and the output of the interferometer 140, the DSP 170 can then produce an interferogram to identify the light wavelength and the spectral print of any material in the light path. Furthermore, the DSP 170 and/or ASIC containing the CSC 130 can generate an actuation signal to control movement of the MEMS actuator 150 to move the mirror 120 to a desired position using the correction amount 610.

In an exemplary embodiment, the calibration module 600 determines the correction amount 610 by determining the actual capacitance of the MEMS actuator 150 at two or more known positions of the moveable mirror 120. For example, the calibration module 600 can compare the actual measured capacitances of the MEMS actuator 150 to corresponding respective capacitances within the table 630 at the two or more known positions to calculate respective errors between the measured actual capacitances and the corresponding capacitances within the table 630. The calibration module 600 can then extrapolate a corrected capacitance sensing curve using the initial capacitance sensing curve and the calculated errors and determine the correction amount 610 based on the difference between the corrected capacitance sensing curve and the initial capacitance sensing curve.

Figure 13:
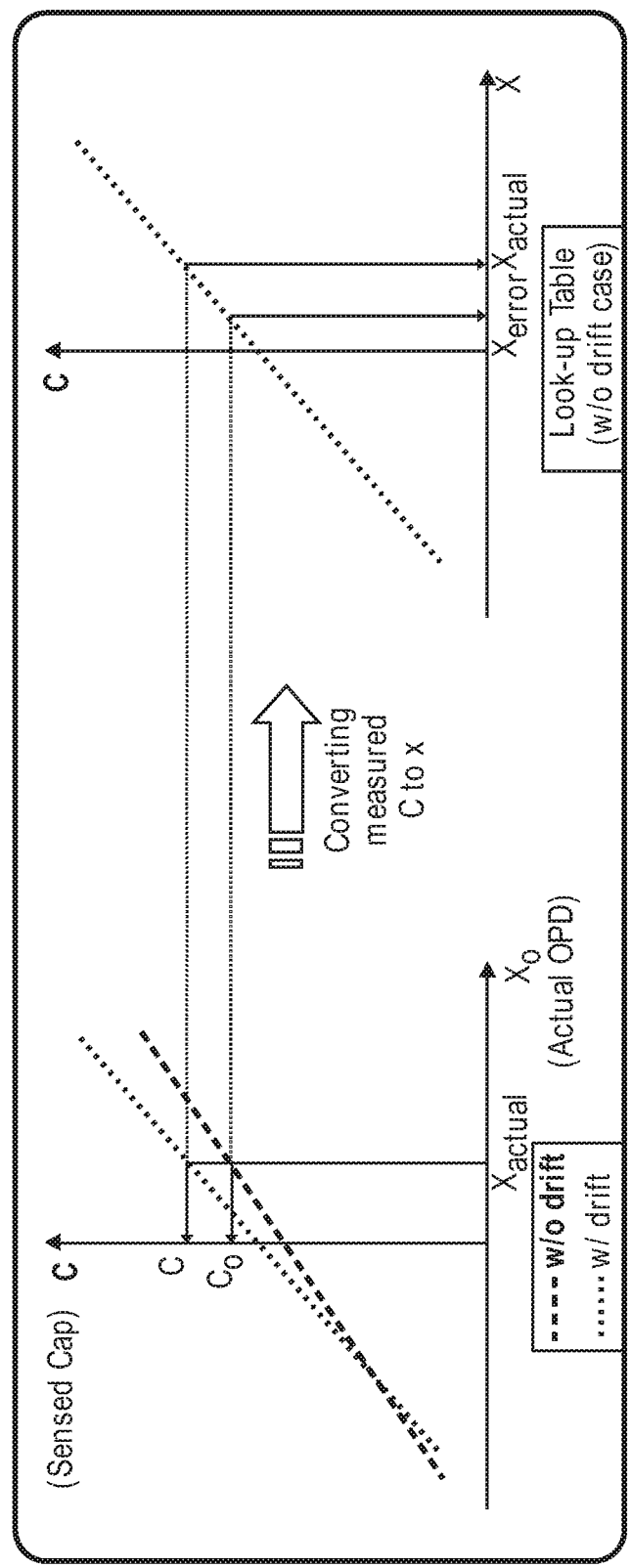
FIG. 13 is a diagram illustrating errors in the mirror position as a result of drift in the capacitive sensing curve, in accordance with embodiments of the present disclosure.

For example, as shown in FIGS. 12A and 12B, drifts in the initial capacitance values (stored in table 630 of FIG. 10) may occur in the form of offset error ($B_d$) and/or gain error ($A_d$). As can be seen in FIGS. 12A and 12B, the initial values stored in the table provide a capacitance value of $B_o$ at zero OPD with a gain of $A_o$. During a subsequent operation of the MEMS interferometer, drift in the CSC has occurred, such that the zero OPD corresponds to a capacitance value of $B_d$ and the gain is now $A_d$. As further shown in FIG. 13, when such drift is present, using the initial values mapping the capacitive sensing to OPD relation results in erroneous OPD values ($x_{error}$ as compared to $x_{actual}$), which can lead to wavelength errors and spectral shift. Therefore, an additional calibration of the initial capacitance values is needed to correct the capacitance/OPD values. The additional calibration produces a correction amount, as described above, which may include an offset error amount and/or gain error amount.

Figure 14:
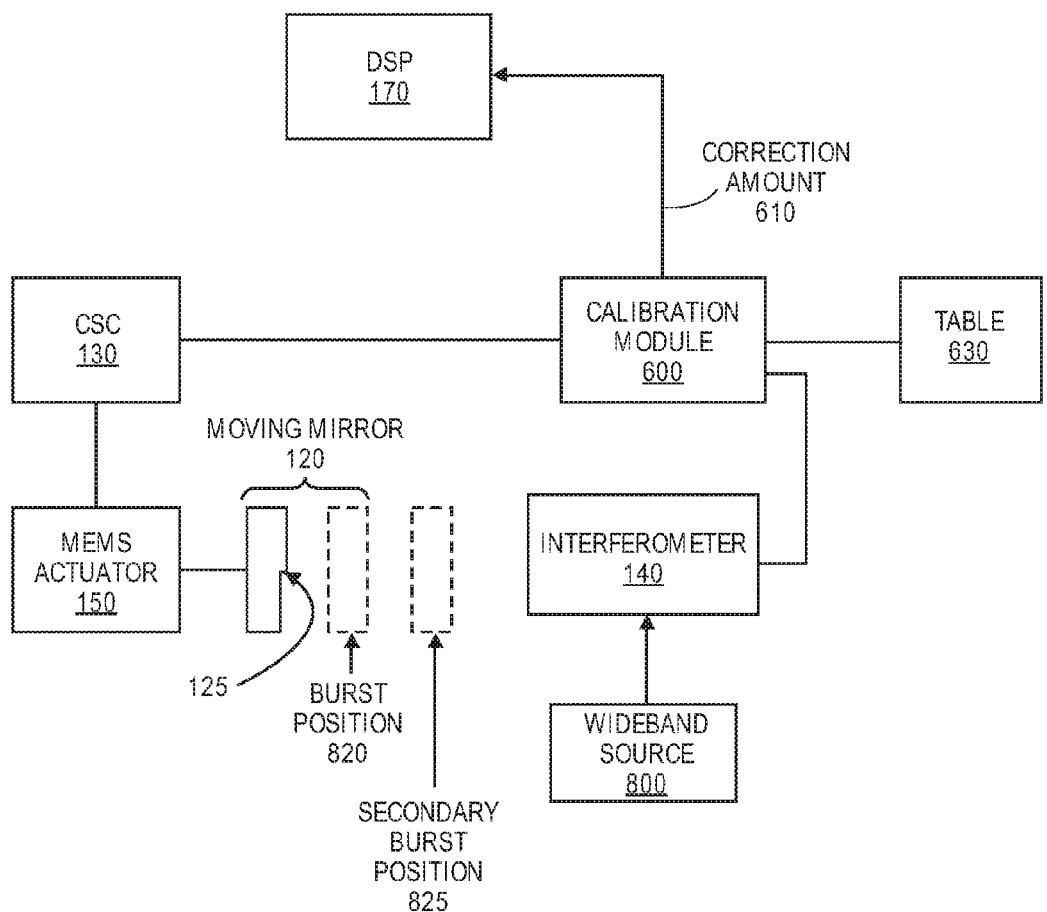
FIG. 14 is a block diagram illustrating exemplary components of a MEMS interferometer system for performing a correction technique to calibrate the mirror position, in accordance with embodiments of the present disclosure.

FIG. 14 illustrates exemplary components of a MEMS interferometer system for performing a correction technique to calibrate the mirror position. As shown in FIG. 14, a wideband light source 800 is used to self-calibrate the MEMS interferometer during calibration of the MEMS interferometer. The wide band light source 800 has a spectrum S(v) that is injected into the interferometer 140. The resulting white light interferogram, shown in FIG. 15, can be expressed as the following for a MEMS interferometer working within a wavenumber range from $v_1$ to $v_2$:

$$I_o(x) = \frac{1}{2}\int_{v_1}^{v_2} S(v)\cos(2\pi vx)dv = \quad \text{(Equation 4)}$$

-continued $$\frac{1}{4}\left[W_v\cos(2\pi v_0 x)\frac{\sin(\pi W_v x)}{\pi W_v x}\right]*s(x),$$

where $$v_0 = \frac{v_1 + v_2}{2} \quad \text{(Equation 5)}$$

$$w_v = v_1 - v_2 \quad \text{(Equation 6)}$$

$$s(x) = \text{Fourier Transform}[S(v)] \quad \text{(Equation 7)}$$

Figure 15:
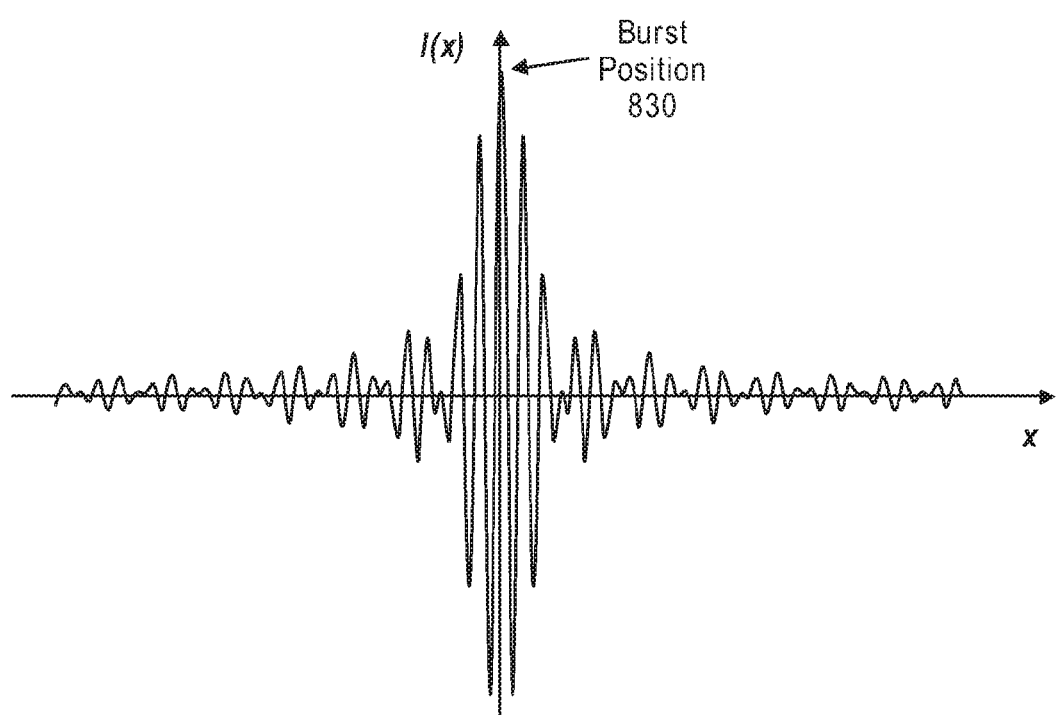
FIG. 15 is a diagram illustrating an interferogram of a white light source, in accordance with embodiments of the present disclosure.

As can be seen in FIG. 15, the mirror position at the center burst 830 of the white light interferogram is irrespective of the source spectrum shape, which makes relying on that position more immune to source fluctuations and drift. Therefore, as shown in FIG. 14, the CSC 130 can continuously measure the capacitance of the MEMS actuator 150 while the white light interferogram is being obtained and provide the measured capacitance values to the calibration module 600. From the resulting interferogram provided by the interferometer 140, the calibration module 600 can determine the measured capacitance when the moving mirror 120 was at a burst position 820 corresponding to the center burst 830 and map that burst position 820 to zero OPD, which can be considered a first reference position for self-calibration.

Figure 17:
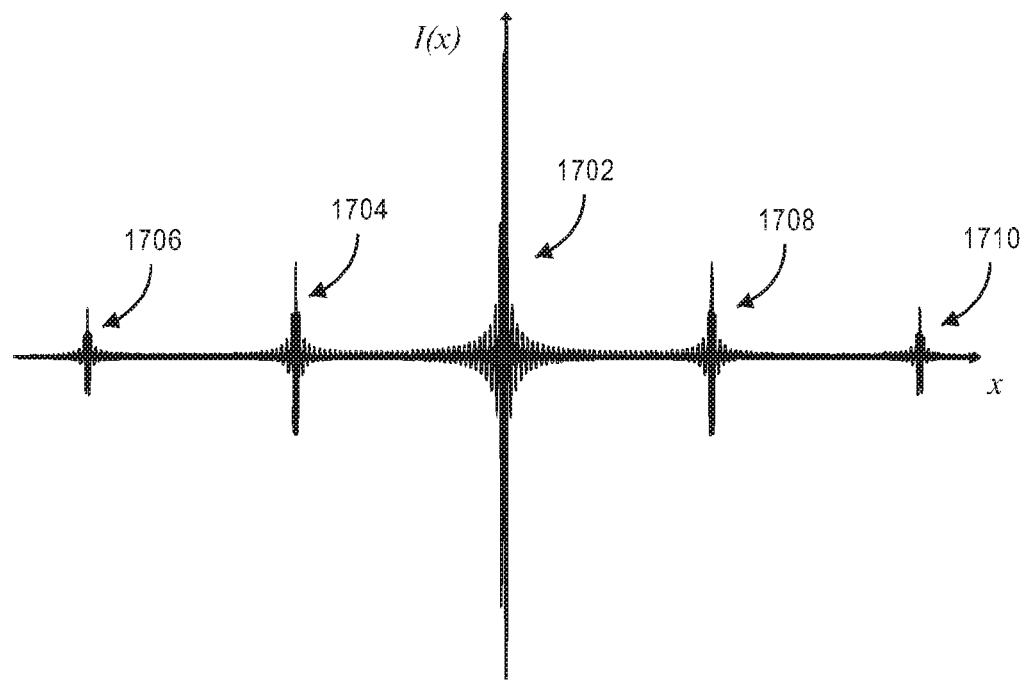
FIG. 17 is a diagram illustrating an interferogram containing a center burst and secondary bursts produced using the moveable mirror shown in FIG. 16.
Figure 18:
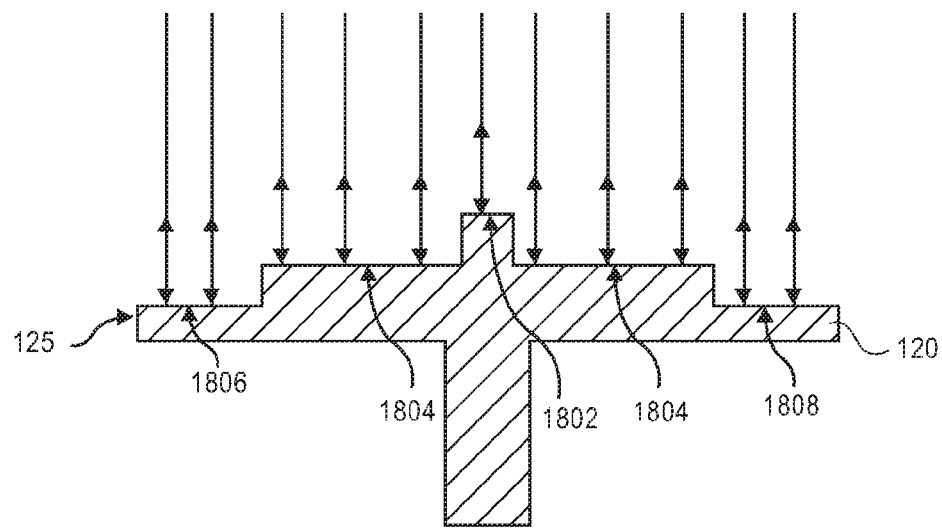
FIG. 18 is a schematic diagram illustrating another exemplary moveable mirror with a non-planar surface, in accordance with embodiments of the present disclosure.
Figure 19A:
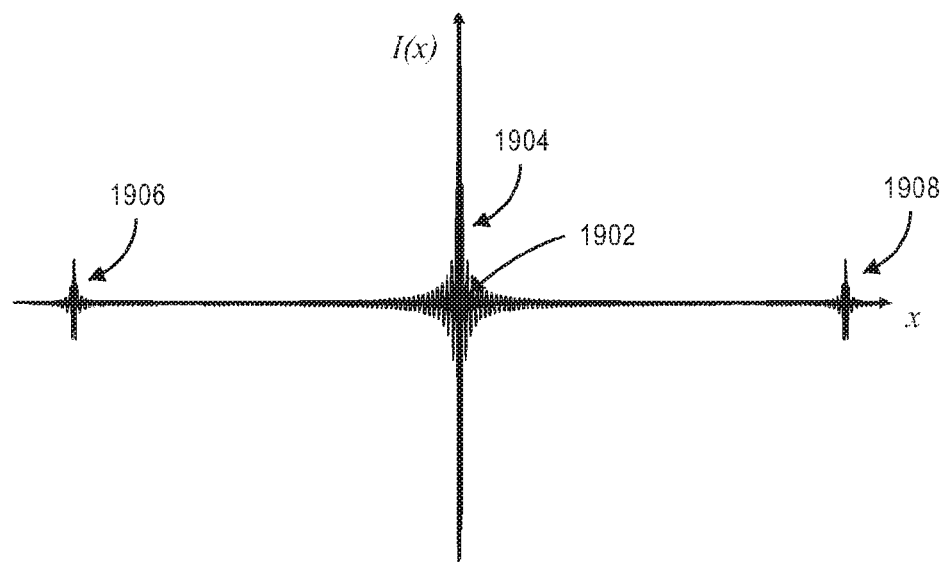
FIG. 19A is a diagram illustrating an interferogram containing a center burst and secondary bursts produced using the moveable mirror shown in FIG. 18.
Figure 20:
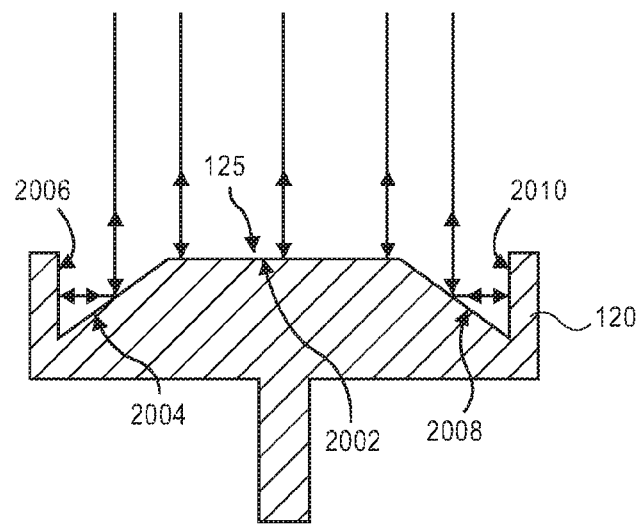
FIG. 20 is a schematic diagram illustrating another exemplary moveable mirror with a non-planar surface, in accordance with embodiments of the present disclosure.
Figure 21A:
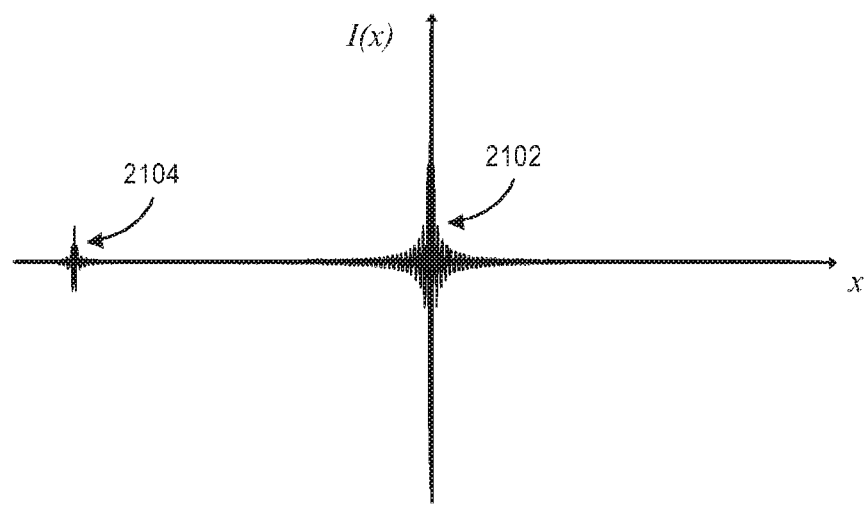
FIG. 21A is a diagram illustrating an interferogram containing a center burst and secondary bursts produced using the moveable mirror shown in FIG. 20.

In addition, shaping a surface 125 of one of the mirrors, such as the moveable mirror 120, to be non-planar, as shown in FIGS. 14, 15, 18 and 20, can produce secondary bursts at multiple zero OPD reference points, as shown in FIGS. 17, 19A and 21A. For example, as can be seen in FIG. 14, the surface 125 of the mirror 120 may include a main surface and at least one additional surface offset from the main surface, where the main surface is centered on the mirror at an optical axis of the interferometer and is configured to produce the center burst of the interferogram, and the additional surface is located near an edge of the moveable mirror and is configured to produce the secondary burst of the interferogram.

The following discussion assumes the moveable mirror 120 has a non-planar surface 125. However, in other embodiments, another mirror in the optical path of the interferometer, such as the fixed mirror shown in FIG. 7, may have a non-planar surface in addition to or in place of the moveable mirror 120.

The calibration module 600 can determine the measured capacitance when the moving mirror was at a secondary burst position 825 corresponding to one of the secondary bursts and map that secondary burst position 825 to zero OPD for the offset surface and use this secondary burst position as another reference position. For example, with a known offset between a main surface producing the center burst 830 and an offset surface producing a secondary burst, the zero OPD position of the offset surface of the moveable mirror is equal to the sum of the zero OPD position of the main surface of the moveable mirror and the known offset. As another example, with a known OPD between the optical path taken via the main surface and the optical path taken via the offset surface, the zero OPD position corresponding to the offset surface of (or secondary burst produced by) the moveable mirror is equal to the sum of the zero OPD position of the main surface of the moveable mirror and the known OPD.

The resulting white light interferogram with multiple bursts can be expressed as the following for a MEMS interferometer:

$$I(x)=I_o(x)+A_1 I_o(x-OPD_1)+A_2 I_o(x-OPD_2)+A_3 I_o(x-OPD_3)+\ldots \quad \text{(Equation 8)}$$

where $A_1$, $A_2$, $A_3$ . . . are the relative intensity of the secondary bursts to the main burst and $OPD_1$, $OPD_2$, $OPD_3$, . . . are the optical path differences between the secondary bursts and the main (center) burst.

Using the measured capacitance at each of the reference positions and the initial capacitance and position values stored in the table 630, the calibration module 600 can determine the correction amount 610 to be applied by the DSP 170 to the capacitance sensing curve (values stored in table 630) during subsequent MEMS interferometer operations. Therefore, any capacitive sensing drifts in subsequent interferograms can be compensated for using the correction amount 610.

In embodiments in which the error in the capacitance measurements versus the position is linear, only two capacitance measurements at known mirror positions are needed to correct for drift errors in the C to x relation. In this embodiment, only two bursts (i.e., the center burst and one secondary burst) are needed in the interferogram to produce the corrected capacitance sensing curve.

Figure 16:
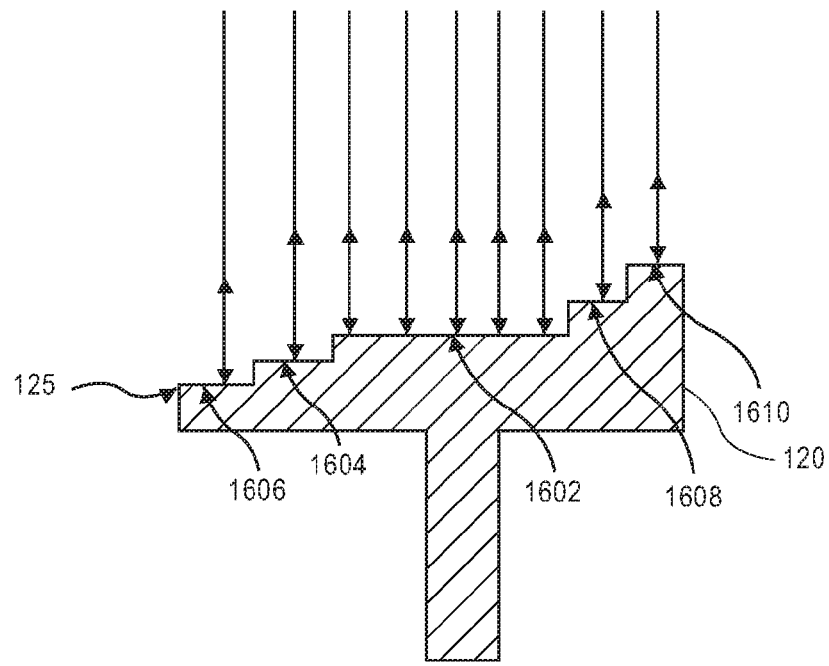
FIG. 16 is a diagram illustrating an exemplary moveable mirror with a non-planar surface, in accordance with embodiments of the present disclosure.

Non-linear drift errors (third degree or higher) may also be corrected by structuring the non-planar surface 125 of the moveable mirror 120 to produce three or more bursts in the interferogram (i.e., the center burst and two or more secondary bursts). For example, as shown in FIG. 16, the surface 125 of moveable mirror 120 may have multiple offset steps to produce an interferogram with multiple bursts, as shown in FIG. 17. For example, the surface 125 may include a main surface 1602 centered at an optical axis of the interferometer and configured to produce a main/center burst 1702 of the interferogram, along with offset surfaces 1604, 1606, 1608 and 1610 offset from the main surface 1602 and configured to produce respective secondary bursts 1704, 1706, 1708 and 1710.

In particular, in the example shown in FIG. 16, the offset surfaces include a first offset surface 1604 adjacent to the main surface 1602 on a first end of the moveable mirror 120, in which the first offset surface 1604 has a first offset respective to the main surface 1602. The offset surfaces further include a second offset surface 1606 adjacent to the first offset surface 1604 on the first end of the moveable mirror, in which the second offset surface has a second offset respective to the main surface 1602. In FIG. 16, the second offset is greater than the first offset in a first direction such that the thickness of the moveable mirror 120 at the second offset surface 1606 is less than the thickness of the moveable mirror 120 at the first offset surface 1604 and the thickness of the moveable mirror 120 at the first offset surface 1604 is less than the thickness of the moveable mirror 120 at the main surface 1602.

The offset surfaces further include a third offset surface 1608 adjacent to the main surface 1602 on a second end of the moveable mirror 120 opposite the first end, in which the third offset surface 1608 has a third offset respective to the main surface 1602. In addition, the offset surfaces also include a fourth offset surface 1610 adjacent to the third offset surface 1608 on the second end of the moveable mirror, in which the fourth offset surface 1610 has a fourth offset respective to the main surface 1602. In FIG. 16, the fourth offset is greater than the third offset in a second direction such that the thickness of the moveable mirror 120 at the fourth offset surface 1610 is greater than the thickness of the moveable mirror 120 at the third offset surface 1608 and the thickness of the moveable mirror 120 at the third offset surface 1608 is greater than the thickness of the moveable mirror 120 at the main surface 1602. With the non-planar surface configuration shown in FIG. 16, the first offset surface 1604 is configured to produce secondary burst 1704, the second offset surface 1606 is configured to produce secondary burst 1706, the third offset surface 1608 is configured to produce secondary burst 1708 and the fourth offset surface 1610 is configured to produce secondary burst 1710 in the interferogram shown in FIG. 17.

FIG. 18 is a schematic diagram illustrating another exemplary moveable mirror 120 with a non-planar surface 125 that includes multiple offset steps to produce an interferogram with multiple bursts, as shown in FIG. 19A. For example, the surface 125 may include a main surface 1804 configured to produce a main/center burst 1904 of the interferogram, along with offset surfaces 1802, 1806 and 1808 offset from the main surface 1804 and configured to produce respective secondary bursts 1902, 1906 and 1908.

In particular, in the example shown in FIG. 18, a first offset surface 1802 is centered on the moveable mirror 120 at an optical axis of the interferometer and is configured to produce secondary burst 1902 of the interferogram. The main surface 1804 is adjacent the first offset surface 1802 on either side thereof and is configured to produce the main/center burst 1904 of the interferogram. The first offset surface 1802 is offset from the main surface 1804 by a first offset amount in a first direction such that the thickness of the moveable mirror 120 at the main surface 1804 is less than the thickness of the moveable mirror 120 at the first offset surface 1802.

Figure 19B:
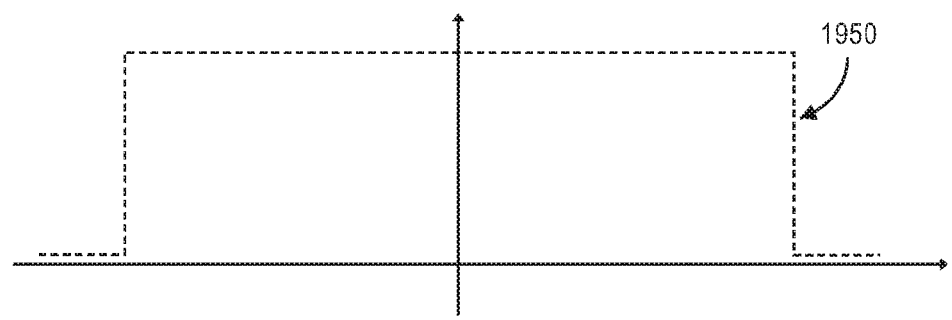
FIG. 19B is a diagram illustrating a window for removal of the Fabry-Perot effect of FIG. 19A.

Second and third offset surfaces 1806 and 1808 are adjacent the main surface 1804 on either side thereof and are offset from the main surface 1804 by a second offset amount in a second direction such that the thickness of the moveable mirror 120 at the main surface 1804 is greater than the thickness of the moveable mirror 120 at the second/third offset surfaces 1806/1808. The second offset surface 1806 is configured to produce secondary burst 1906 of the interferogram, while the third offset surface 1808 is configured to produce secondary burst 1908 of the interferogram. The Fabry Perot-like effect that can result from having multiple bursts on the spectrum can be removed by applying window 1950 to the interferogram, depending on the wanted resolution, as shown in FIG. 19B.

FIG. 20 is a schematic diagram illustrating another exemplary moveable mirror 120 with a non-planar surface 125 to produce an interferogram with multiple bursts, as shown in FIG. 21A. For example, the surface 125 may include a main surface 2002 configured to produce a main/center burst 2102 of the interferogram, along with additional surfaces 2004, 2006, 2008 and 2010 configured to produce secondary burst 2104.

Figure 21B:
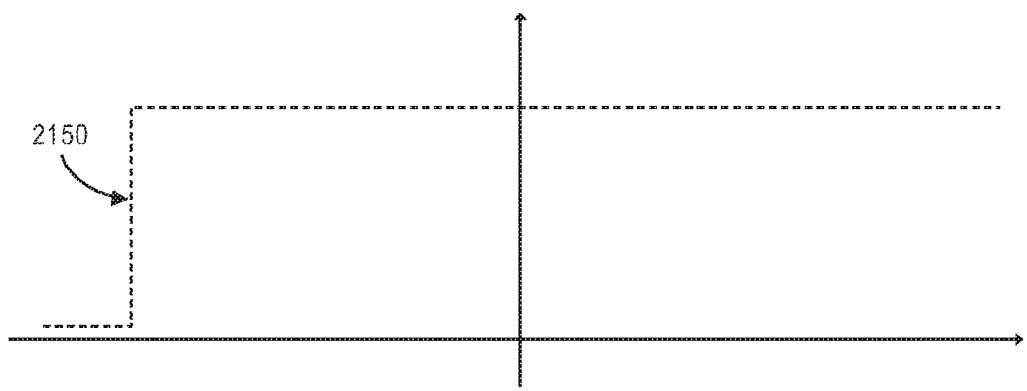
FIG. 21B is a diagram illustrating a window for removal of the Fabry-Perot effect of FIG. 21A.

In particular, in the example shown in FIG. 20, the additional surfaces include corresponding angled surfaces 2004 and 2008 on each side of the main surface 2002 and corresponding reflecting surfaces 2006 and 2010 on each side of the main surface 2002. The main surface 2002 is centered on the moveable mirror 120 at an optical axis of the interferometer and is configured to produce the center burst 2102 of the interferogram. The angled surfaces 2004 and 2008 are each positioned at a respective angle to the main surface 2002 and configured to reflect light off of a respective one of the reflecting surfaces 2006 and 2010 to produce the secondary burst 2104 of the interferogram. The Fabry Perot-like effect that can result from having multiple bursts on the spectrum can be removed by applying window 2150 to the interferogram, depending on the wanted resolution, as shown in FIG. 21B.

Figure 22:
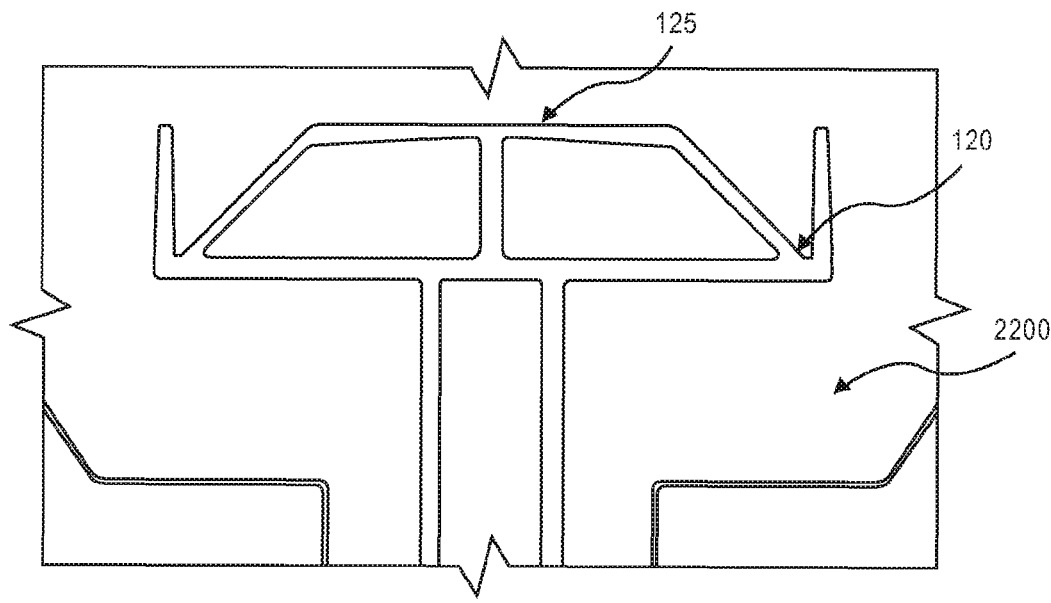
FIG. 22 illustrates a top view of an exemplary moveable mirror with a non-planar surface fabricated on a substrate, in accordance with embodiments of the present disclosure.

FIG. 22 illustrates a top view of an exemplary moveable mirror 120 with a non-planar surface 125 fabricated on a substrate 2200, in accordance with embodiments of the present disclosure. The surface 125 is similar to that shown in FIG. 20. In one example, the moveable mirror 120 (and other components of the MEMS interferometer system) can be fabricated by selective etching of a silicon-on-insulator (SOI) wafer (substrate 2200) using any type of isotropic and/or anisotropic etching technique, such as Deep Reactive Ion Etching (DRIE).

Figure 23:
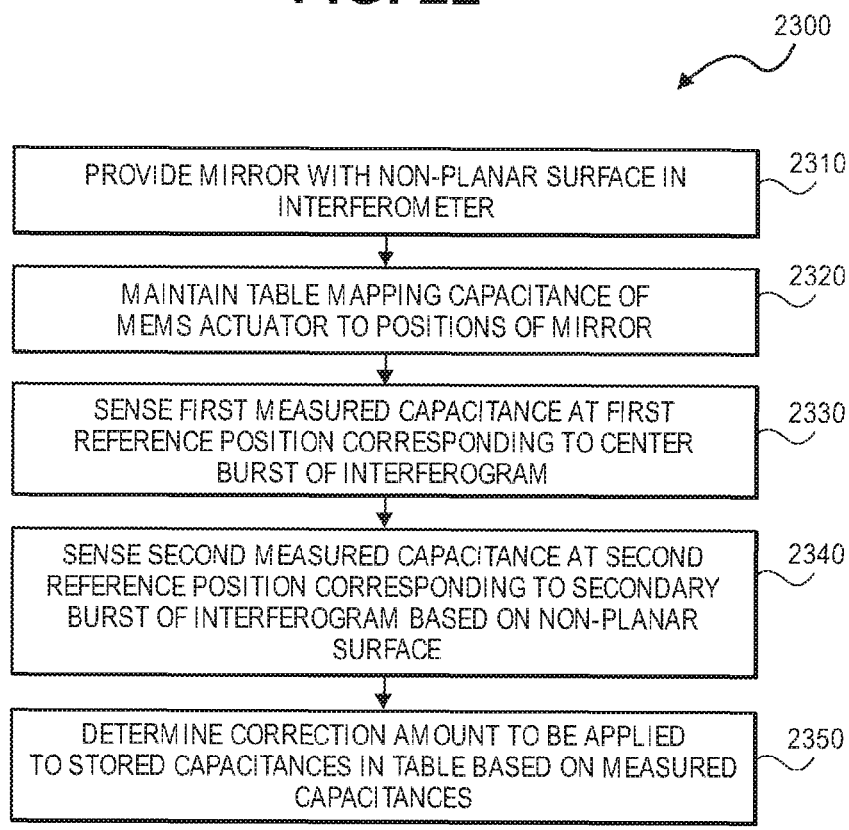
FIG. 23 illustrates an exemplary method for self-calibration for mirror positioning within an optical MEMS interferometer, in accordance with embodiments of the present disclosure.

FIG. 23 illustrates an exemplary method 2300 for self-calibration for mirror positioning within an optical MEMS interferometer, in accordance with embodiments of the present disclosure. The method begins at 2310, where a mirror with a non-planar surface is provided in an interferometer. In one example, the mirror with the non-planar surface is the moveable mirror. In another example, the mirror with the non-planar surface is a fixed mirror or a combination of a fixed mirror and a moveable mirror (i.e., both the fixed mirror and the moveable mirror have respective non-planar surfaces).

At 2320, a table mapping stored capacitances of the MEMS actuator to respective stored positions of the moveable mirror is maintained. The stored capacitances and respective stored positions may be obtained during an initial calibration of the MEMS interferometer. At 2330, a first measured capacitance of the MEMS actuator is sensed at a first reference position of the moveable mirror corresponding to a center burst of an interferogram produced as a result of movement of the moveable mirror. At 2340, a second measured capacitance of the MEMS actuator is sensed at a second reference position of the moveable mirror corresponding to a secondary burst of the interferogram produced as a result of movement of the moveable mirror and the non-planar surface of the moveable mirror and/or fixed mirror. At 2350, a correction amount to be applied to the stored capacitances within the table is determined using the first measured capacitance at the first reference position and the second measured capacitance at the second reference position.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A Micro-Electro-Mechanical System (MEMS) apparatus, comprising:
  a MEMS interferometer configured to produce an interferogram, the MEMS interferometer comprising:
    at least one mirror optically coupled to receive and reflect light, a first mirror of the at least one mirror having a non-planar surface, the non-planar surface comprising a main surface and at least one additional surface offset from the main surface; and
    a MEMS actuator coupled to a moveable mirror of the at least one mirror to produce a displacement thereof, the MEMS actuator having a variable capacitance;
  a memory maintaining a table mapping stored capacitances of the MEMS actuator to respective stored positions of the moveable mirror;

a capacitive sensing circuit coupled to the MEMS actuator, the capacitive sensing circuit configured to:
  sense a first measured capacitance of the MEMS actuator at a first reference position of the moveable mirror corresponding to a center burst of the interferogram; and
  sense a second measured capacitance of the MEMS actuator at a second reference position of the moveable mirror corresponding to a secondary burst of the interferogram produced as a result of the non-planar surface; and
a calibration module configured to use the first measured capacitance at the first reference position and the second measured capacitance at the second reference position to determine a correction amount to be applied to the stored capacitances in the table.

2. The MEMS apparatus of claim 1, wherein the capacitive sensing circuit is further configured to determine a current capacitance of the MEMS actuator, and further comprising:
  a digital signal processor configured to access the table to determine a current position of the moveable mirror based on a combination of the current capacitance of the MEMS actuator and the correction amount.

3. The MEMS apparatus of claim 1, further comprising:
a light source configured to produce an input beam having a known wavelength and provide the input beam to the interferometer;
the capacitive sensing circuit is further configured to measure a capacitance variation as the moveable mirror moves through at least two zero crossings of an additional interferogram produced by the MEMS interferometer; and
a digital signal processor configured to populate the table based on the capacitance variation and the additional interferogram.

4. The MEMS apparatus of claim 1, wherein:
the table represents an initial capacitance sensing curve;
the calibration module is further configured to compare the first and second measured capacitances of the MEMS actuator to the corresponding respective stored capacitances within the table at the first and second reference positions to calculate respective errors between the first and second measured capacitances and the corresponding stored capacitances within the table; and
the calibration module is further configured to extrapolate a corrected capacitance sensing curve using the initial capacitance sensing curve and the calculated errors, the correction amount corresponding to a difference between the corrected capacitance sensing curve and the initial capacitance sensing curve.

5. The MEMS apparatus of claim 1, further comprising:
a wide band light source configured to produce a wide band light beam and provide the wide band light beam to the MEMS interferometer during sensing of the first and second measured capacitances.

6. The MEMS apparatus of claim 5, further comprising:
a narrow band optical filter optically coupled to receive the wide band light beam and configured to produce an input beam having a known wavelength and provide the input beam to the interferometer;
the capacitive sensing circuit is further configured to measure a capacitance variation as the moveable mirror moves through at least two zero crossings of an additional interferogram produced by the MEMS interferometer; and a digital signal processor configured to populate the table based on the capacitance variation and the additional interferogram.

7. The MEMS apparatus of claim 1, wherein:
the capacitive sensing circuit is further configured to sense at least one additional measured capacitance of the MEMS actuator at a respective at least one additional reference position of the moveable mirror corresponding to a respective at least one additional secondary burst of the interferogram produced as a result of movement of the moveable mirror and the non-planar surface; and
the calibration module is further configured to use the first measured capacitance at the first reference position, the second measured capacitance at the second reference position and the at least one additional measured capacitance at the respective at least one additional reference position to determine the correction amount.

8. The MEMS apparatus of claim 1, wherein:
the main surface is centered on the first mirror at an optical axis of the interferometer and is configured to produce the center burst of the interferogram;
the at least one additional surface is located near an edge of the first mirror and is configured to produce the secondary burst of the interferogram.

9. The MEMS apparatus of claim 8, wherein the at least one additional surface includes:
a first offset surface adjacent to the main surface on a first end of the first mirror, the first offset surface having a first offset respective to the main surface;
a second offset surface adjacent to the first offset surface on the first end of the first mirror, the second offset surface having a second offset respective to the main surface;
a third offset surface adjacent to the main surface on a second end of the first mirror opposite the first end, the third offset surface having a third offset respective to the main surface; and
a fourth offset surface adjacent to the third offset surface on the second end of the first mirror, the fourth offset surface having a fourth offset respective to the main surface;
wherein each of the first offset surface, the second offset surface, the third offset surface and the fourth offset surface is configured to produce a respective secondary burst of the interferogram.

10. The MEMS apparatus of claim 1, wherein:
the at least one additional surface comprises an offset surface offset from the main surface by an offset amount;
the offset surface is centered on the first mirror at an optical axis of the interferometer and is configured to produce the secondary burst of the interferogram;
the main surface is adjacent the offset surface on either side thereof and is configured to produce the center burst of the interferogram.

11. The MEMS apparatus of claim 10, wherein the non-planar surface of the first mirror further includes an additional offset surface offset from the main surface by an additional offset amount, the additional offset surface adjacent the main surface on either side thereof and configured to produce additional secondary bursts of the interferogram.

12. The MEMS apparatus of claim 1, wherein:
the at least one additional surface comprises corresponding angled surfaces on each side of the main surface and corresponding reflecting surfaces on each side of the main surface;

the main surface is centered on the first mirror at an optical axis of the interferometer and is configured to produce the center burst of the interferogram;

the angled surfaces are each positioned at a respective angle to the main surface and configured to reflect light off of a respective one of the reflecting surfaces to produce the secondary burst of the interferogram.

13. The MEMS apparatus of claim 1, wherein the MEMS actuator is an electrostatic actuator having two plates, the capacitive sensing circuit configured to sense the current capacitance between the two plates.

14. The MEMS apparatus of claim 13, wherein the MEMS actuator is an electrostatic comb drive actuator.

15. The MEMS apparatus of claim 1, wherein the capacitive sensing circuit includes a capacitance-to-voltage converter configured to receive the current capacitance and produce an output voltage proportional to the capacitance.

16. The MEMS apparatus of claim 1, wherein the MEMS interferometer further includes:

a beam splitter optically coupled to receive an incident beam and to split the incident beam into a first interfering beam and a second interfering beam;

a fixed mirror optically coupled to receive the first interfering beam and to reflect the first interfering beam back towards the beam splitter to produce a first reflected interfering beam;

the moveable mirror optically coupled to receive the second interfering beam and to reflect the second interfering beam back towards the beam splitter to produce a second reflected interfering beam; and a detector optically coupled to detect the interferogram produced as a result of interference between the first reflected interfering beam and the second reflected interfering beam;

wherein the displacement of the moveable mirror produces an optical path length difference between the first and second interfering beams equal to twice the displacement.

17. The MEMS apparatus of claim 16, wherein the center burst and the secondary burst each correspond to a zero optical path length difference between the first and second interfering beams.

18. The MEMS apparatus of claim 1, wherein the MEMS interferometer includes a Fourier Transform Infrared (FTIR) spectrometer.

19. The MEMS apparatus of claim 1, wherein the first mirror is the moveable mirror.

20. A method for calibrating a Micro-Electro-Mechanical System (MEMS) interferometer, comprising:

producing an interferogram by the MEMS interferometer, wherein the MEMS interferometer comprises at least one mirror and a MEMS actuator, a first mirror of the at least one mirror having a non-planar surface, the non-planar surface comprising a main surface and at least one additional surface offset from the main surface, a moveable mirror of the at least one mirror coupled to the MEMS actuator, the MEMS actuator having a variable capacitance;

maintaining a table mapping stored capacitances of the MEMS actuator to respective stored positions of the moveable mirror;

sensing a first measured capacitance of the MEMS actuator at a first reference position of the moveable mirror corresponding to a center burst of the interferogram;

sensing a second measured capacitance of the MEMS actuator at a second reference position of the moveable mirror corresponding to a secondary burst of the interferogram produced as a result of the non-planar surface; and determining a correction amount to be applied to the stored capacitances within the table using the first measured capacitance at the first reference position and the second measured capacitance at the second reference position.

21. The method of claim 20, further comprising:

determining a current capacitance of the MEMS actuator; and determining a current position of the moveable mirror based on a combination of the current capacitance of the MEMS actuator and the correction amount.

22. The method of claim 20, further comprising:

receiving an input beam having a known wavelength at the MEMS interferometer;

measuring a capacitance variation as the moveable mirror moves through at least two zero crossings of an additional interferogram produced by the MEMS interferometer; and populating the table based on the capacitance variation and the interferogram.

23. The method of claim 20, wherein the table represents an initial capacitance sensing curve, and further comprising:

comparing the first and second measured capacitances of the MEMS actuator to corresponding respective stored capacitances within the table at the first and second reference positions to calculate respective errors between the first and second measured capacitances and the corresponding stored capacitances within the table;

extrapolating a corrected capacitance sensing curve using the initial capacitance sensing curve and the calculated errors; and determining the correction amount as a difference between the corrected capacitance sensing curve and the initial capacitance sensing curve.

24. The method of claim 20, further comprising:

sensing at least one additional measured capacitance of the MEMS actuator at a respective at least one additional reference position of the moveable mirror corresponding to a respective at least one additional secondary burst of the interferogram produced as a result of movement of the moveable mirror and the non-planar surface; and determining the respective position corrections to be applied to the stored positions within the table using the first measured capacitance at the first reference position, the second measured capacitance at the second reference position and the at least one additional measured capacitance at the respective at least one additional reference position.

25. The method of claim 20, wherein the center burst and the secondary burst each correspond to a zero optical path length difference within the MEMS interferometer as a result of the non-planar surface.

26. The method of claim 20, wherein the first mirror is the moveable mirror.

* * * * *